US008152877B2

(12) United States Patent
Greene (10) Patent No.: US 8,152,877 B2
(45) Date of Patent: Apr. 10, 2012

(54) SHROUD FOR A CLEANING SERVICE APPARATUS (75) Inventor: Mason Isaac Greene, Auburn, AL (US)

(73) Assignee: Euro-Pro Operating LLC, Newton, MA (US)

( * ) Notice: Subject to any disclaimer, the term of this patent is extended or adjusted under 35 U.S.C. 154(b) by 66 days.

(21) Appl. No.: 12/723,281

(22) Filed: Mar. 12, 2010

(65) Prior Publication Data
US 2011/0219733 A1  Sep. 15, 2011

(51) Int. Cl.
*B01D 50/00* (2006.01)
(52) U.S. Cl. ............. 55/337; 55/447; 55/459.1; 55/428; 55/429; 55/DIG. 3; 15/352; 15/353
(58) Field of Classification Search .............. 55/337, 55/DIG. 3, 447, 459.1, 428, 429; 15/352, 15/353
See application file for complete search history.

(56) References Cited

U.S. PATENT DOCUMENTS

| | | | |
|---|---|---|---|
| 2,580,317 A | 12/1951 | Pekar et al. | |
| 2,726,767 A | 12/1955 | Rakowsky | |
| 3,320,727 A | 5/1967 | Farley et al. | |
| 3,957,471 A | 5/1976 | Tamachi et al. | |
| 5,078,761 A | 1/1992 | Dyson | |
| 5,893,936 A | 4/1999 | Dyson | |
| 6,146,434 A | 11/2000 | Scalfani et al. | |
| 6,350,292 B1 | 2/2002 | Lee et al. | |
| 6,406,505 B1 | 6/2002 | Oh et al. | |
| 6,558,453 B2 | 5/2003 | Sepke et al. | |
| 6,572,668 B1 | 6/2003 | An et al. | |
| 6,588,055 B2 | 7/2003 | Bair et al. | |
| 6,679,930 B1 | 1/2004 | An et al. | |
| 6,829,804 B2 | 12/2004 | Sepke | |
| 6,833,015 B2 | 12/2004 | Oh et al. | |
| 6,857,165 B2 | 2/2005 | Oh | |
| 6,863,702 B2 | 3/2005 | Sepke et al. | |
| 6,896,711 B2 | 5/2005 | Oh | |
| 6,896,719 B2 | 5/2005 | Coates et al. | |
| 6,910,245 B2 | 6/2005 | Hawkins et al. | |
| 6,968,596 B2 | 11/2005 | Oh et al. | |
| 7,160,346 B2 | 1/2007 | Park | |
| 7,162,770 B2 | 1/2007 | Davidshofer | |
| 7,247,181 B2 | 7/2007 | Hansen et al. | |

(Continued)

FOREIGN PATENT DOCUMENTS
DE        729 104 C     12/1942

(Continued)

OTHER PUBLICATIONS

International Search Report and Written Opinion for PCT/US2011/022820 mailed Oct. 26, 2011.

(Continued)

Primary Examiner — Jason M Greene
Assistant Examiner — Dung H Bui
(74) Attorney, Agent, or Firm — Wolf, Greenfield & Sacks, P.C.

(57) ABSTRACT

A surface cleaning apparatus has a cyclone chamber and a dirt collection chamber exterior to the cyclone chamber. The cyclone chamber has an air inlet and an opposed end. The dirt outlet from the cyclone chamber comprises a gap at the terminal end of a cyclone chamber wall proximate the opposed end. A shroud extends inwardly into the cyclone chamber from the opposed end and is preferably tapered in the upstream direction.

19 Claims, 7 Drawing Sheets

U.S. PATENT DOCUMENTS

| | | | |
|---|---|---|---|
| 7,422,615 B2* | 9/2008 | Kim ........................... | 55/426 |
| 7,544,226 B2 | 6/2009 | Oh | |
| 7,547,351 B2* | 6/2009 | Oh et al. ..................... | 95/271 |
| 7,559,964 B2* | 7/2009 | Oh et al. ..................... | 55/424 |
| 7,603,745 B2 | 10/2009 | Frederickson | |
| 7,615,089 B2 | 11/2009 | Oh | |
| 7,632,324 B2 | 12/2009 | Makarov et al. | |
| 7,637,973 B2* | 12/2009 | Oh et al. ..................... | 55/337 |
| D608,961 S | 1/2010 | Reese et al. | |
| D608,962 S | 1/2010 | Reese et al. | |
| D608,963 S | 1/2010 | Reese et al. | |
| 7,708,791 B2* | 5/2010 | Oh et al. ..................... | 55/345 |
| 7,744,667 B2* | 6/2010 | Oh et al. ..................... | 55/343 |
| 7,780,752 B2* | 8/2010 | Cha et al. .................... | 55/288 |
| 7,785,381 B2* | 8/2010 | Oh et al. ..................... | 55/300 |
| 7,794,515 B2* | 9/2010 | Oh et al. ..................... | 55/343 |
| 7,803,205 B2* | 9/2010 | Oh et al. ..................... | 55/337 |
| 7,854,779 B2* | 12/2010 | Oh .............................. | 55/337 |
| 2002/0178701 A1 | 12/2002 | Oh et al. | |
| 2003/0221277 A1 | 12/2003 | Oh et al. | |
| 2004/0103786 A1 | 6/2004 | Hiltunen et al. | |
| 2005/0252179 A1* | 11/2005 | Oh et al. ..................... | 55/337 |
| 2007/0079587 A1* | 4/2007 | Kim ........................... | 55/349 |
| 2008/0047091 A1* | 2/2008 | Nguyen ...................... | 15/300.1 |
| 2009/0158932 A1 | 6/2009 | Arnold | |
| 2009/0165431 A1* | 7/2009 | Oh .............................. | 55/337 |
| 2009/0178378 A1* | 7/2009 | Bertram et al. ............. | 55/391 |
| 2009/0205162 A1* | 8/2009 | Oh et al. ..................... | 15/353 |
| 2009/0217635 A1* | 9/2009 | Bertram et al. ............. | 55/428 |
| 2010/0024367 A1* | 2/2010 | Howes ........................ | 55/447 |
| 2010/0162517 A1* | 7/2010 | Han et al. ................... | 15/352 |
| 2010/0299865 A1* | 12/2010 | Conrad ....................... | 15/353 |
| 2010/0299866 A1* | 12/2010 | Conrad ....................... | 15/353 |

FOREIGN PATENT DOCUMENTS

| | | |
|---|---|---|
| EP | 0 284 675 A1 | 10/1988 |
| EP | 0 424 079 A1 | 4/1991 |
| EP | 0 928 594 A1 | 7/1999 |
| GB | 716383 A | 10/1954 |
| JP | 50-083866 | 7/1975 |
| JP | 3-135461 | 6/1991 |
| JP | 2000-157463 A | 6/2000 |
| JP | 2004-121722 A | 4/2004 |
| JP | 2004-129783 A | 4/2004 |
| JP | 2005-103251 A | 4/2005 |
| KR | 10-2001-0104810 A | 11/2001 |
| KR | 10-2001-0113181 A | 12/2001 |
| KR | 10-2003-0030302 A | 4/2003 |
| KR | 10-2006-008365 A | 1/2006 |
| WO | WO 01/17688 A1 | 3/2001 |
| WO | WO 2009/026709 A1 | 3/2009 |

OTHER PUBLICATIONS

Shark® Cordless VX63. Owner's Manual. Euro-Pro Operating LLC. 2009. 13 pages.

\* cited by examiner

SHROUD FOR A CLEANING SERVICE APPARATUS

FIELD

This specification relates to surface cleaning apparatus such as vacuum cleaners, steam cleaners and carpet extractors. More specifically, the specification relates to surface cleaning apparatus, which include at least one cyclonic cleaning stage.

INTRODUCTION

Various constructions for surface cleaning apparatus such as vacuum cleaners are known. Currently, many surface cleaning apparatus are constructed using at least one cyclonic cleaning stage. The air is drawn into the vacuum cleaner through a dirty air inlet and conveyed to a cyclone inlet. The rotation of the air in the cyclone results in some of the particulate matter in the airflow stream being disentrained from the airflow stream. This material is then collected in a dirt collection chamber, which may be at the bottom of the cyclone or in a dirt collection chamber exterior to the cyclone chamber (see for example WO2009/026709 and U.S. Pat. No. 5,078,761). One or more additional cyclonic cleaning stages and/or filters may be positioned downstream from the cyclone.

In order to improve the performance of a cyclone, it is known to include a screen or shroud at the position at which the air exits the cyclone. For example, U.S. Pat. No. 5,078,761 discloses a shroud surrounding an inner second stage frusto-conical cyclone. See also U.S. Pat. No. 7,632,324, which utilizes a perforated tube and U.S. Pat. No. 6,968,596, which utilizes a grill portion with a plurality of fine passage holes.

Various designs for cyclones and shrouds, screens or filter assemblies for use in the cyclone have been developed to improve the performance of a cyclone for a surface cleaning apparatus. In some cases, shrouds or screens are provided that have openings that are perpendicular to the outer surface of the shroud. In some cases, the air is guided into the shroud (see for example U.S. Pat. No. 7,544,226).

SUMMARY

According to one broad aspect, a cyclone for use in a surface cleaning apparatus is provided in a housing and has its air inlet at an opposed end to the air outlet of the housing (e.g., a unidirectional flow cyclone). The dirt outlet comprises the open end of the cyclone at the air exit end. A shroud is provided and extends into the cyclone chamber. Accordingly, the cyclone may comprise an air inlet at a first end and an air outlet at a second opposed end. The cyclone chamber wall extends from the air inlet end towards the air outlet end but is spaced from the air outlet end. The dirt collection chamber is provided surrounding at least a portion, and preferably all, of the cyclone chamber. The dirt outlet is defined by the space between the end of the cyclone wall distal to the cyclone inlet end and the outlet end. A shroud extends inwardly into the cyclone and has a downstream end that is in flow communication with an air outlet from the housing. The shroud contains a plurality of airflow passages therethrough.

The housing may be a cyclone unit that is removably mounted to the surface cleaning apparatus. If the dirt collection chamber surrounds the cyclone chamber, then the dirt collection chamber may comprise the housing in which the cyclone chamber is provided. The dirt collection chamber has opposed ends, a first at or towards the air inlet end of the cyclone and a second near the dirt outlet of the cyclone. The air outlet from the housing may be provided in the second end of the dirt collection chamber.

In operation, air is introduced into the cyclone through, preferably a tangential air inlet. The air travels in a cyclonic pattern longitudinally through the cyclone. Entrained particulate matter is disentrained from the airflow and carried longitudinally along the inner surface of the cyclone chamber wall. When the dirt travels longitudinally past the distal end of the cyclone chamber wall, the dirt travels outwardly into the dirt collection chamber. The treated air travels inwardly through holes in the shroud and longitudinally in the direction of the cyclone towards the air exit of the shroud. The air may then be subsequently treated in a further filtration step (e.g. one or more additional cyclonic stages and/or one or more physical filter elements).

The dirt that is entrained by a surface cleaning apparatus such as a vacuum cleaner typically is quite varied in terms of the density of the material as well as the particle size of the material. For example, the dirt which is entrained in an air flow stream may include fine sand, light elongate material such as hair, large bulky material such as pieces of popcorn and the like. The cyclone and shroud construction disclosed herein provides good, reliable separation efficiency for various particle sizes and particle densities.

In accordance with one aspect of this embodiment of the invention there is provided a surface cleaning apparatus comprising:
  (a) an air flow passage extending from a dirty air inlet to a clean air outlet;
  (b) a dirt collection chamber extending between first and second opposed ends;
  (c) a unidirectional flow cyclone positioned in the dirt collection chamber and comprising an air inlet at the first end, an air outlet at the second end and a cyclone chamber wall extending from the first end towards the second end, the cyclone chamber wall having an end face that is spaced from and faces the second end to define a gap between the end face and the second end, the gap comprising a dirt outlet of the cyclone;
  (d) a perforated shroud comprising a downstream portion that is positioned between the second end and the end face of the cyclone chamber wall and an upstream portion that is positioned in the cyclone chamber, the upstream portion having a closed end that is distal to the second end; and
  (e) a suction motor positioned in the air flow passage.

In accordance with another aspect of this embodiment of the invention there is provided a surface cleaning apparatus comprising:
  (a) an air flow passage extending from a dirty air inlet to a clean air outlet; a cyclone unit positioned in the air flow passage, the cyclone unit comprising at least one cyclone chamber and at least one dirt collection chamber positioned exterior to the cyclone chamber;
  (b) the cyclone chamber comprising an air inlet at a first end, an air outlet at an opposed second end and a cyclone chamber wall extending from the first end towards the second end, the cyclone chamber wall having an end face that is spaced from and faces the second end;
  (c) a perforated shroud extending from the air outlet towards the first end; and,
  (d) a suction motor positioned in the air flow passage.

In any embodiment, the upstream portion of the shroud may taper inwardly from the downstream portion to the closed end. Preferably, the shroud tapers continuously inwardly from a position in a plane defined by the end face to the closed end.

In any embodiment, the cyclone chamber wall may be conical and increases in diameter towards the second end.

In any embodiment, the cyclone chamber wall may be tapered outwardly from the first end to the end face and the shroud may be tapered inwardly, the shroud may be spaced inwardly from the cyclone chamber wall by a distance that is generally constant along the length of the upstream portion of the shroud.

In any embodiment the downstream portion of the shroud may have an outer wall that is continuous.

In any embodiment the upstream portion of the shroud may be provided with air exit passages.

In any embodiment the shroud may be mounted to the second end and the second end is removably mounted to the dirt collection chamber.

In any embodiment the second end may comprise the upper end of the cyclone.

In any embodiment the shroud may be tapered.

In any embodiment the shroud may have an outlet end proximate the second end and a spaced apart, distal closed end and the distal closed end has a smaller diameter then the outlet end.

In any embodiment the shroud may taper continuously inwardly from the closed end to an end of the cyclone chamber defined by the end face.

In any embodiment a downstream portion of the shroud may be positioned between the second end and the end face of the cyclone chamber wall and the downstream portion may have an outer wall that is continuous.

In any embodiment an upstream portion of the shroud may be positioned in the cyclone chamber and perforations may be provided only in an outer wall of the upstream portion.

In any embodiment the shroud may be mounted to the second end and the second end may be removably mounted to the cyclone unit.

In any embodiment the second end may comprise the upper end of the cyclone unit.

In any embodiment the dirt collection chamber may surround the cyclone chamber.

In any embodiment the closed end is spaced inwardly towards the end face up to one third the length of the cyclone chamber from the cyclone air inlet.

DRAWINGS

These and other advantages of the invention will more fully and particularly understood in accordance with the following description of a preferred embodiment of the invention in which.

DESCRIPTION OF VARIOUS EMBODIMENTS

In the drawings attached hereto, the surface cleaning apparatus is exemplified as an upright vacuum cleaner 10. It will be appreciated that the surface cleaning apparatus may be of various configurations (e.g. a canister vacuum cleaner, a hand held vacuum cleaner, a back-pack vacuum cleaner and the like). In addition, the surface cleaning apparatus may be of various types (e.g. a wet/dry vacuum cleaner, a carpet extractor, a vacuum cleaner, a steam vacuum cleaner and the like). In addition, any of these products may contain one or more additional cyclonic cleaning stages and/or additional filtration stages, such as physical filter elements. It will also be appreciated that the cyclone and shroud construction disclosed herein may be used as a first stage cleaning step. However, in other embodiments, additional air treatment members may be provided upstream and/or downstream of the cyclone. It will be appreciated that the cyclone chamber and the dirt collection chamber may be in any orientation. Preferably, as exemplified herein, the air inlet of the cyclone chamber is below the opposed end of the cyclone chamber during use. Accordingly, for convenience, the air inlet end of the cyclone chamber and the portion of the dirt collection chamber in which the dirt collects may be referred to as the lower end and the opposed ends may be referred to as the upper ends.

Figure 1:
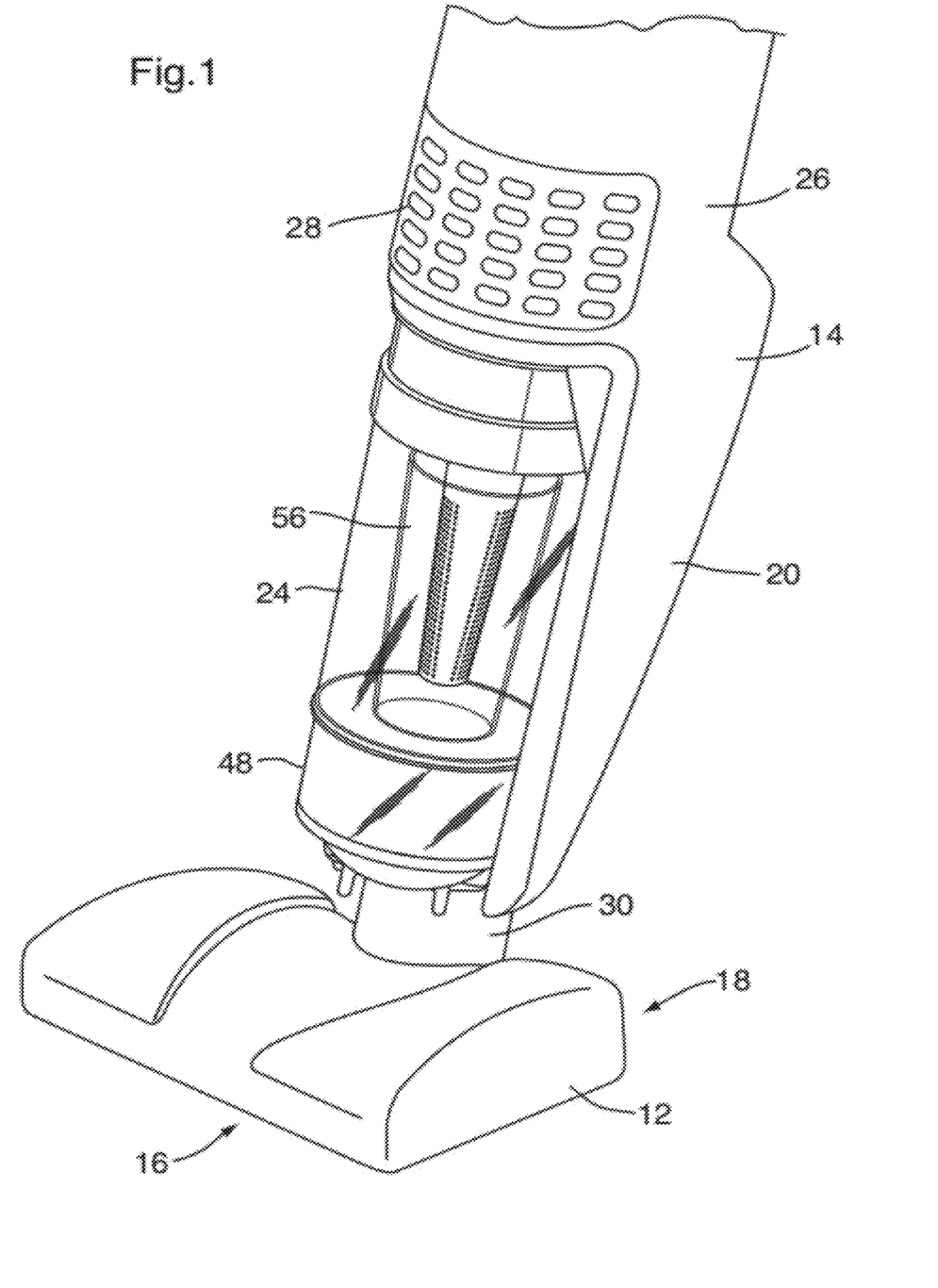
FIG. 1 is a perspective view of a portion of an upright vacuum cleaner.

Referring to FIG. 1, vacuum cleaner 10 comprises a floor cleaning head 12 and an upright section 14 pivotally mounted to floor cleaning head 12. Floor cleaning head 12 may be of any construction known in the industry. As exemplified, floor cleaning head has a front end 16 and a rear end 18. A dirty air inlet is provided in the lower surface of floor cleaning head 12. Floor cleaning head 12 may include a brush member, such as a rotating brush as is known in the art. Wheels, glide members or other conveyance members may be provided to permit floor cleaning head 12 to travel over the floor that is to be cleaned.

Upright section 14 is pivotally mounted to floor cleaning head 12 by any means known in the art. As exemplified, upright section 14 comprises a housing 20 having a recess 22 in which cyclone unit 24 is removably mounted. When mounted in recess 22, cyclone unit 24 forms part of the airflow path through vacuum cleaner 10.

As exemplified, upright section 14 includes motor housing 26 positioned above recess 22. An air exit grill 28 is provided immediately above recess 22 and provides the clean air outlet for vacuum cleaner 10. It will be appreciated that the suction motor may be provided at any location in vacuum cleaner 10 (it may be upright section 14 or it may be in floor cleaning head 12 as known in the art). Accordingly, the airflow path from the dirty air inlet to the clean air outlet may be of various configurations. Further a handle for driving the cleaning head may be provided on upright section 14 or floor cleaning head 12 as is known in the art (not shown).

Figure 2:
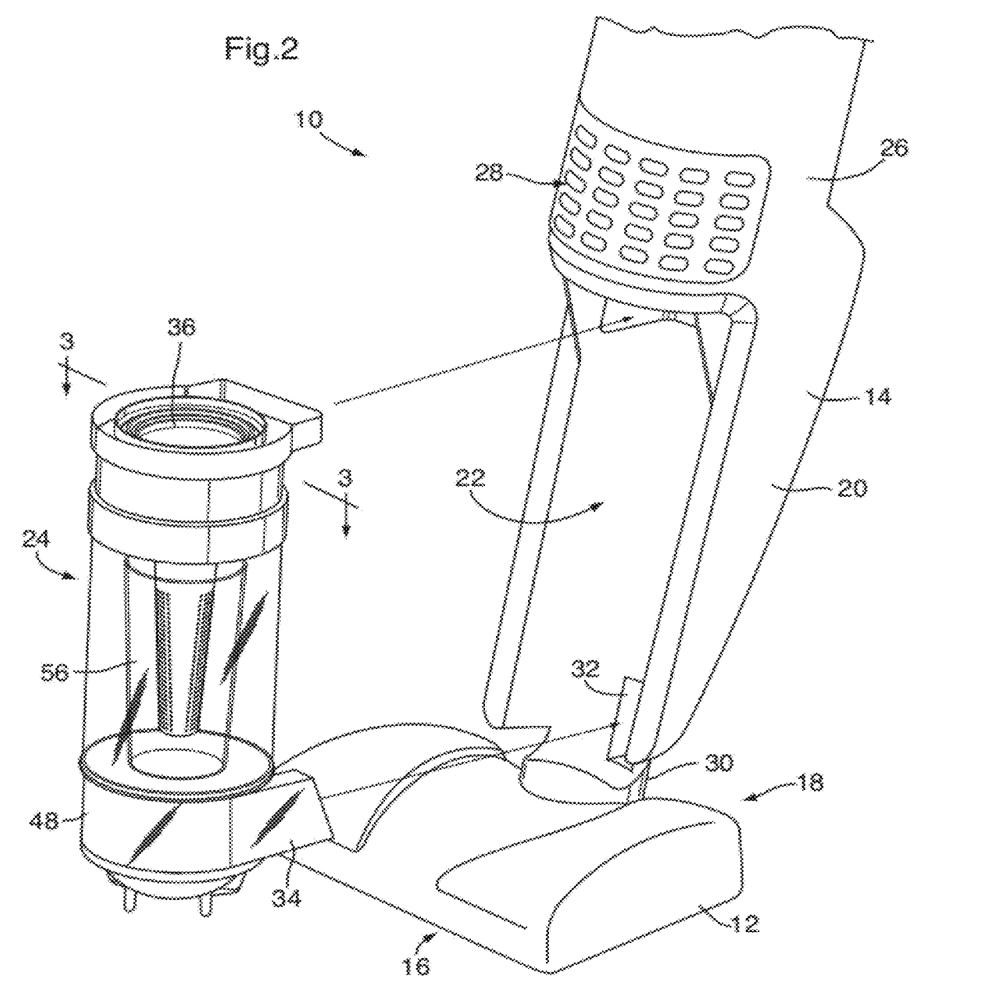
FIG. 2 is an exploded view of the vacuum cleaner of FIG. 1 wherein the cyclone unit has been removed from the upright section of the vacuum cleaner.

Referring to FIG. 2, air travels through floor cleaning head 12, upwardly through an airflow passage, that may be in bottom 30 of upright section 14, and exits housing 14 at air outlet 32. Once cyclone unit 24 is inserted into recess 22, cyclone unit air inlet 34 is in fluid communication with outlet 32. In addition, when cyclone unit 24 is inserted into recess 22, cyclone unit air outlet 36 is in air flow communication with housing 14 and in particular with the air flow passage extending through housing 14 to the suction motor in motor housing 26. It will be appreciated that cyclone unit air inlet 34 and cyclone unit air outlet 36 may be provided at various locations in cyclone unit 24. For example, cyclone unit air inlet may be axially oriented and cyclone unit air outlet 36 may be at an angle to the longitudinal axis of cyclone chamber 56.

The cyclone chamber and dirt collection chamber construction exemplified in FIGS. 3-7 will now be discussed. It will be appreciated that the cyclone chamber and dirt collection chamber construction is exemplified in removable cyclone unit 24. In an alternate embodiment, the dirt collection chamber and cyclone chamber need not be removed from vacuum cleaner 10 as a sealed unit for emptying. For example, the cyclone chamber and dirt collection chamber may be removable downwardly from upright section 14 and the lid of these chambers may remain in position in upright section 14.

As exemplified therein, cyclone unit 24 comprises a lower air inlet section 38, a cyclone section 40 and an upper filter section 42. In alternate embodiments, all sections may not be required. For example, a filter may not be provided as part of cyclone unit 24.

Figure 4:
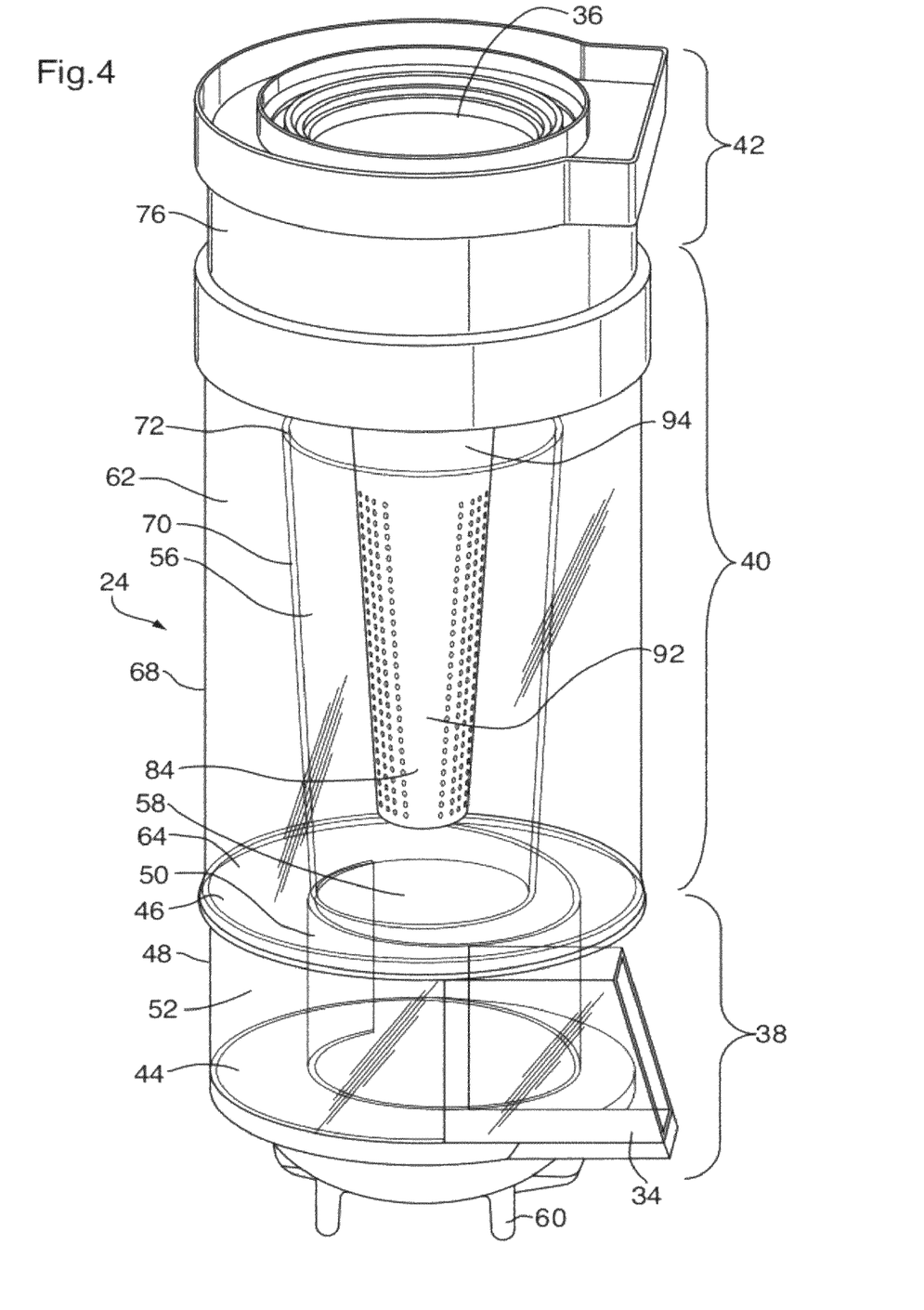
FIG. 4 is a perspective view of the cyclone unit of FIG. 3.

Cyclone unit air inlet 34 is provided on air inlet section 38. Cyclone unit air inlet 34 extends to air inlet chamber 52 which is defined between lower wall 44 of air inlet section 38, lower wall 46 of cyclone section 40, outer wall 38 and inner wall 50. As shown in FIG. 4, air inlet chamber 52 defines a curved or spiral chamber extending from the outlet of cyclone unit air inlet 34 to air inlet end 54 of cyclone chamber 56. Air enters cyclone chamber 56 at an opening 58 provided in inner wall 50. In an alternate embodiment, the air inlet to the cyclone may be of any other construction known in the vacuum cleaner arts and may be a tangential inlet ending at cyclone chamber wall 70. Accordingly, an inlet section need not be provided.

As exemplified, air inlet section 38 is provided with optional feet 60 to assist cyclone unit 24 properly seating in recess 22.

Figure 3:
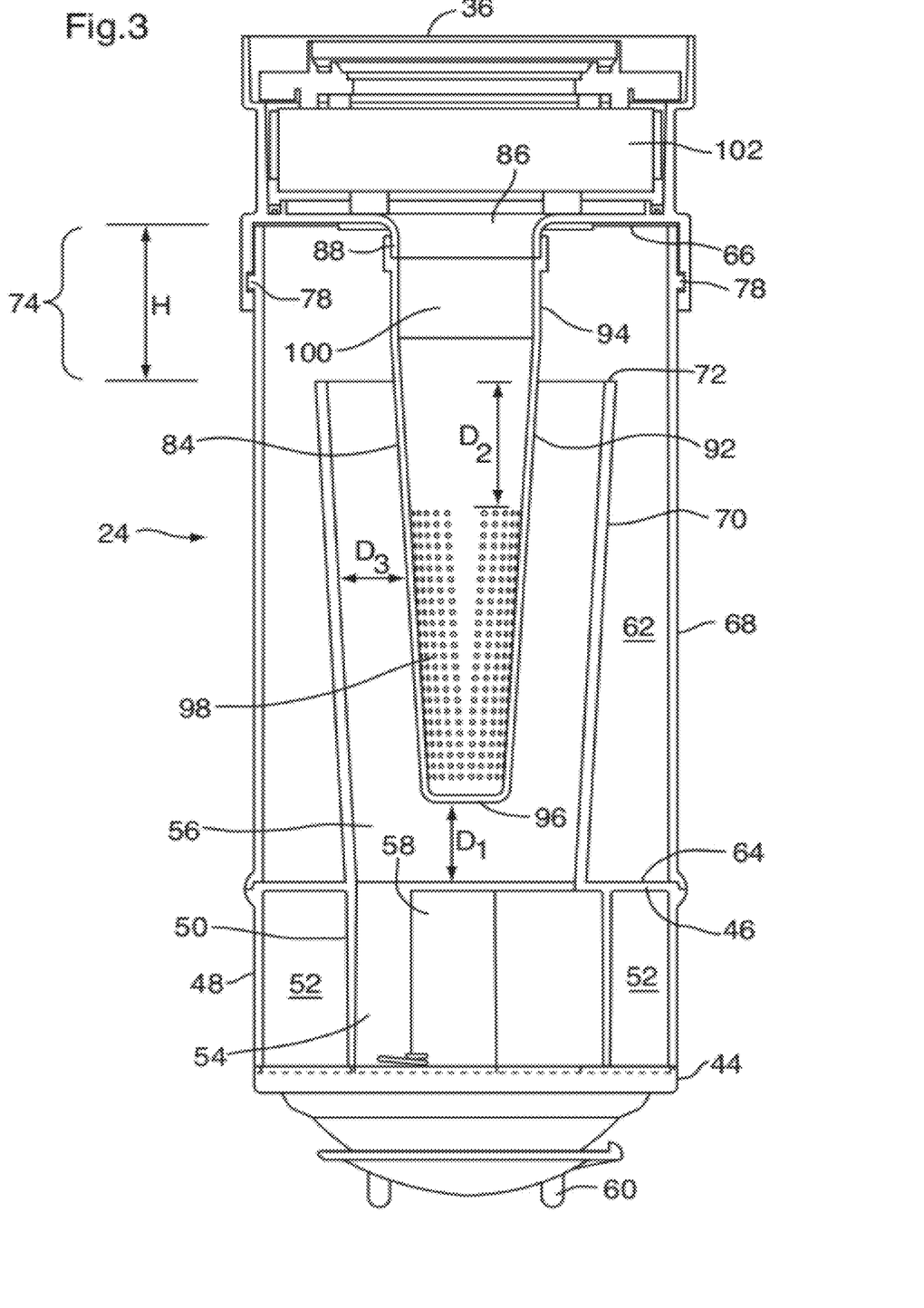
FIG. 3 is a cross-section along the line 3-3 in FIG. 2.

Cyclone section 40 comprises cyclone chamber 56 and dirt collection chamber 62. Referring to FIG. 3, cyclone chamber 56 extends between lower wall 64 and upper wall 66 and is positioned between outer wall 68 and cyclone chamber wall 70. Accordingly, dirt collection chamber 62 extends between first and second opposed ends, which, as exemplified, are defined by lower and upper walls 64 and 66. As exemplified, cyclone chamber 56 is positioned wholly within cyclone chamber 62 and, preferably, centrally within dirt collection chamber 62. Accordingly, it will be seen that dirt collection chamber 62 comprises an annular space surrounding cyclone chamber 56. In alternate embodiments, it will be appreciated that dirt collection chamber 62 may partially surround cyclone chamber 56 or may be positioned exterior to cyclone chamber 56. The upper end of dirt collection chamber 62 may comprise a passage from the dirt outlet of cyclone chamber 56 to the dirt collection region (e.g., lower wall 64 of dirt collection chamber 62).

Cyclone chamber wall 70 extends longitudinally from lower wall 46 towards upper wall 66 but terminates at a distance spaced therefrom. Accordingly, cyclone chamber wall 70 has an end face 72 that is spaced from and faces the second end of dirt collection chamber 62 to define a gap 74 having a height H. Gap 74 accordingly defines the dirt outlet of cyclone chamber 56. As exemplified, height H is about 25% of the length of the cyclone chamber from lower wall 44 of opening 58 to end face 72. However, it will be appreciated that height H may vary.

Figure 5:
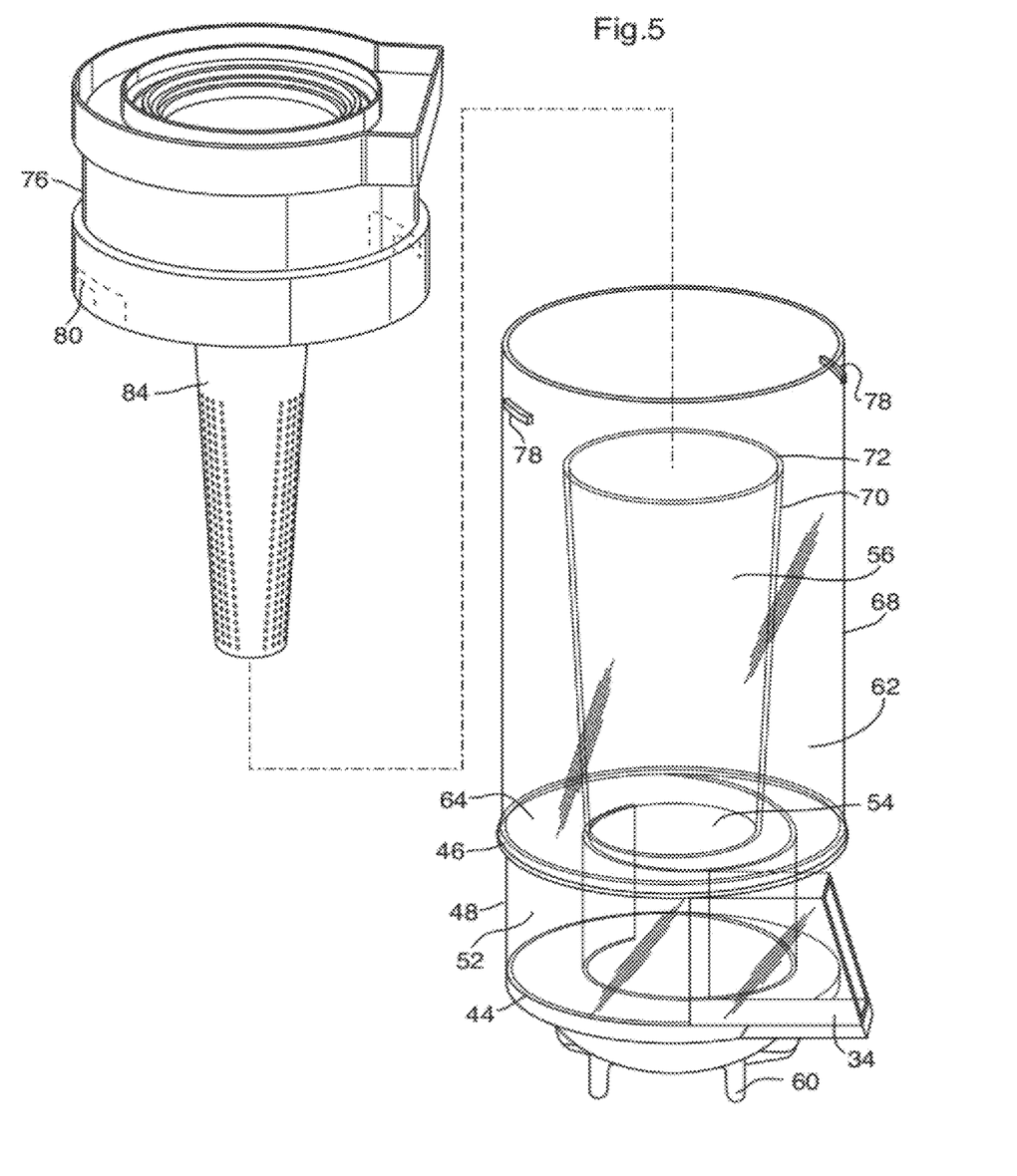
FIG. 5 is an exploded view of the cyclone unit of FIG. 5 with the lid and shroud removed.

Filter section 42 comprises an optional openable lid 76 (see for example FIG. 5). Lid 76 may be removably mounted to cyclone section 40 by any means known in the art. For example, as exemplified in FIGS. 5 and 7, outer wall 68 may be provided with one or more ribs 78 which are removably received in groves 80 provided on inner wall 82 of lid 76. Accordingly, lid 80 may be rotated and then moved away from cyclone section 40. It will be appreciated by a person skilled in the art that other removable mounting means, such as a screw thread or the like may be used instead of the exemplified bayonet mount.

Perforated shroud 84 is provided on lid 76 and, preferably, is removably mounted to lid 76. As exemplified, lid 76 is provided with an opening 86 in upper wall 66. Descending wall 84 is provided to define opening 86. Shroud 84 is provided with an upper collar 90 which seats on descending wall 88. It will be appreciated that shroud 84 may be mounted to descending wall 88 by any means known in the art, such as by a friction fit, bayonet mount, screw mount, welding an adhesive or the like. It will also be appreciated that the method to mount shroud 84 to lid 75 may be any alternate means provided that the shroud is in fluid connection with the air outlet through lid 76.

In an alternate embodiment, it will be appreciated that filter section 42 may comprise an upper wall having an air outlet to which shroud 84 is mounted and that the upper wall may be fixed in position. Dirt collection chamber 62 may be emptied by, e.g., constructing the dirt collection chamber to have an openable lower wall 46 as is known in the art.

As shroud 84 is mounted to lid 76, it will be appreciated that shroud 84 has an upstream portion 92 that is positioned in cyclone chamber 56 and a downstream portion that is positioned between wall 66 and end face 72 (i.e. it is positioned exterior to cyclone chamber 56).

Figure 7:
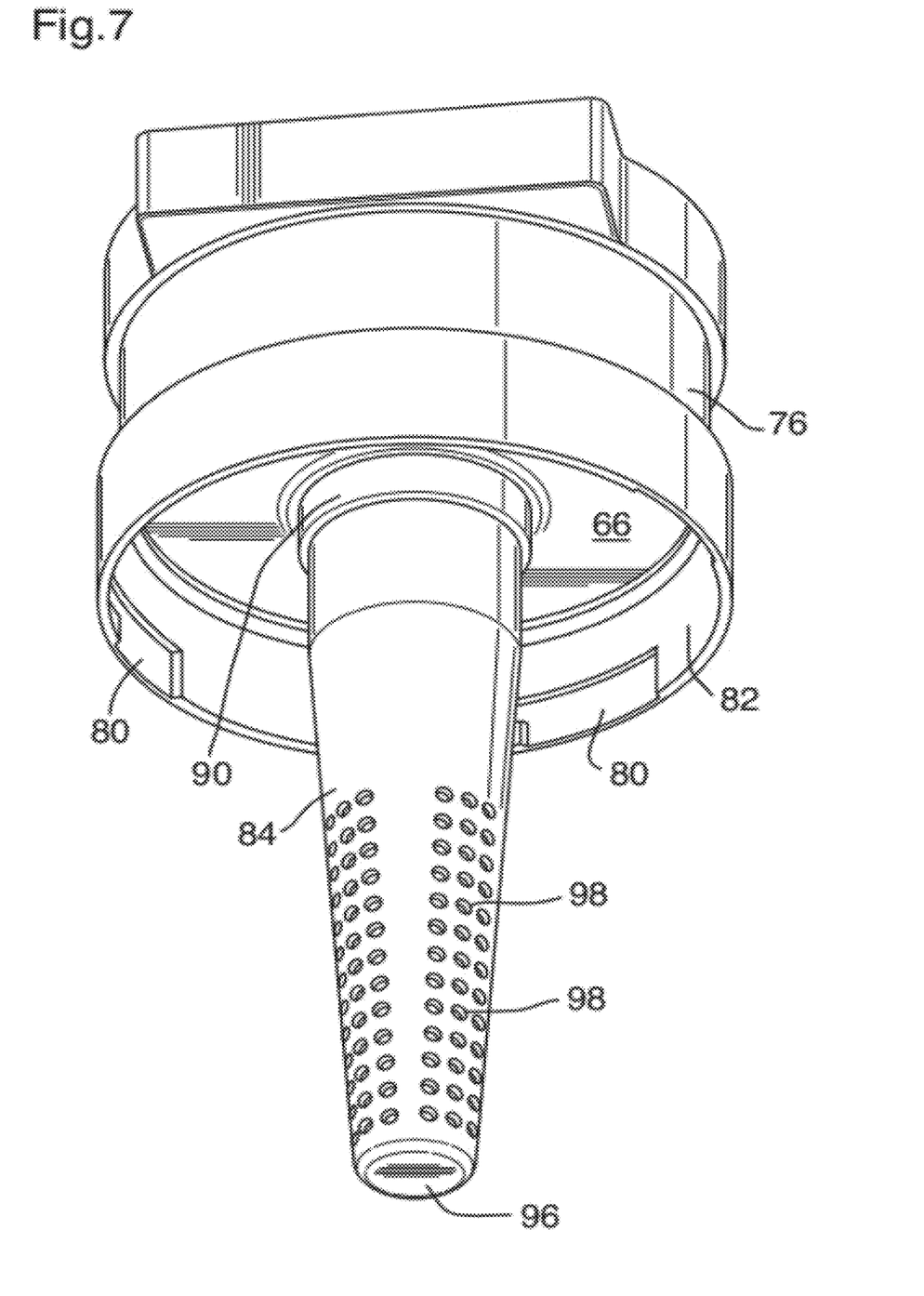

Upstream portion 92 of shroud 84 is provided with a closed end 96 and a plurality of perforations 98 (see for example FIG. 7). Closed end 96 is preferably spaced from lower wall 44 and, may be spaced upwardly from air inlet end 54 of cyclone chamber 56 (i.e. it may be positioned spaced upwardly form the plane defined by lower wall 64 of dirt collection chamber 62). Closed end 96 may be positioned at the upper end of air inlet 58 (i.e., $D_1$ may be 0). Alternately, closed end 96 may be spaced about one third of the length of cyclone chamber wall 70 from the upper end of air inlet 58. Accordingly, closed end 96 may be spaced a distance $D_1$ of from 0 to one third, more preferably from 10 to 25% of the length of the cyclone chamber excluding the position occupied by the cyclone inlet.

Perforations 98 are preferably only provided on upstream section 92 of shroud 84. Accordingly, downstream portion 94 of shroud 84 may have a continuous outer wall (i.e., preferably it does not have any perforations therein). Accordingly, the air exiting cyclone chamber 56 enters longitudinal passage 100 in the interior of shroud 84 via perforations 98 (which comprise air exit passages from cyclone chamber 56 into passage 100).

Perforations 98 may be provided in any pattern or arrangement and may be of varying sizes. The perforations may all be of the same size or may be of differing sizes. In addition, the perforations may be provided on the entirety of upstream sections 92 or only a portion thereof. For example, perforations 98 may terminate a distance $D_2$ downwardly from end face 72 of cyclone chamber wall 70. Distance $D_2$ may vary from 0 to 25% of the length of cyclone chamber 62 (i.e. from lower wall 44 to end face 72).

Preferably, at last one of shroud 84 and cyclone chamber wall 70 and, more preferably, both of shroud 84 and cyclone chamber wall 70 are tapered. As shown in FIG. 3, upstream portion 92 of shroud 84 tapers inwardly in the upstream direction (e.g., from downstream portion 94 to closed end 96) and, preferably, tapers continuously inwardly in the upstream direction at a constant angle. It will be appreciated that, optionally, downstream portion 94 of shroud 84 may also be tapered or, alternately, may have a constant diameter (e.g. it may be cylindrical). As exemplified, shroud 84 transitions from a frustoconical tapered member to a conical member at a mid point of downstream portion 94.

In addition, as exemplified, cyclone chamber wall 70 preferably tapers outwardly in the downstream direction (e.g., from lower wall 64 to end face 72). Preferably, as exemplified, cyclone chamber wall 70 tapers outwardly continuously along its length and, preferably, at a constant angle. Accordingly, cyclone chamber wall 70 may be conical and increase in diameter towards the second end of dirt collection chamber 62.

In a particular preferred embodiment, the annular gap between shroud 84 and dirt collection chamber 70 has a distance $D_3$ transverse to the longitudinal axis of cyclone chamber. In this preferred embodiment, distance $D_3$ is generally constant along the length of upstream portion 92 of shroud 84. Accordingly, despite the shroud increasing in diameter in the downstream direction, the annular gap $D_3$ between the shroud and cyclone chamber wall 70 need not decrease. It will be appreciated that, in alternate embodiments, the distance $D_3$ may vary somewhat and, optionally, could increase.

Lid 76 may optionally comprise one or more filtration members. For example, as exemplified, lid 76 is provided with filter 102, which is downstream from opening 86. The air travels through filter 86 (which may be a sponge filter) and exits lid 76 via outlet 36.

It will be appreciated that outlet 36 need not be in the upper wall of lid 76 but may be in a sidewall thereof.

Figure 6:
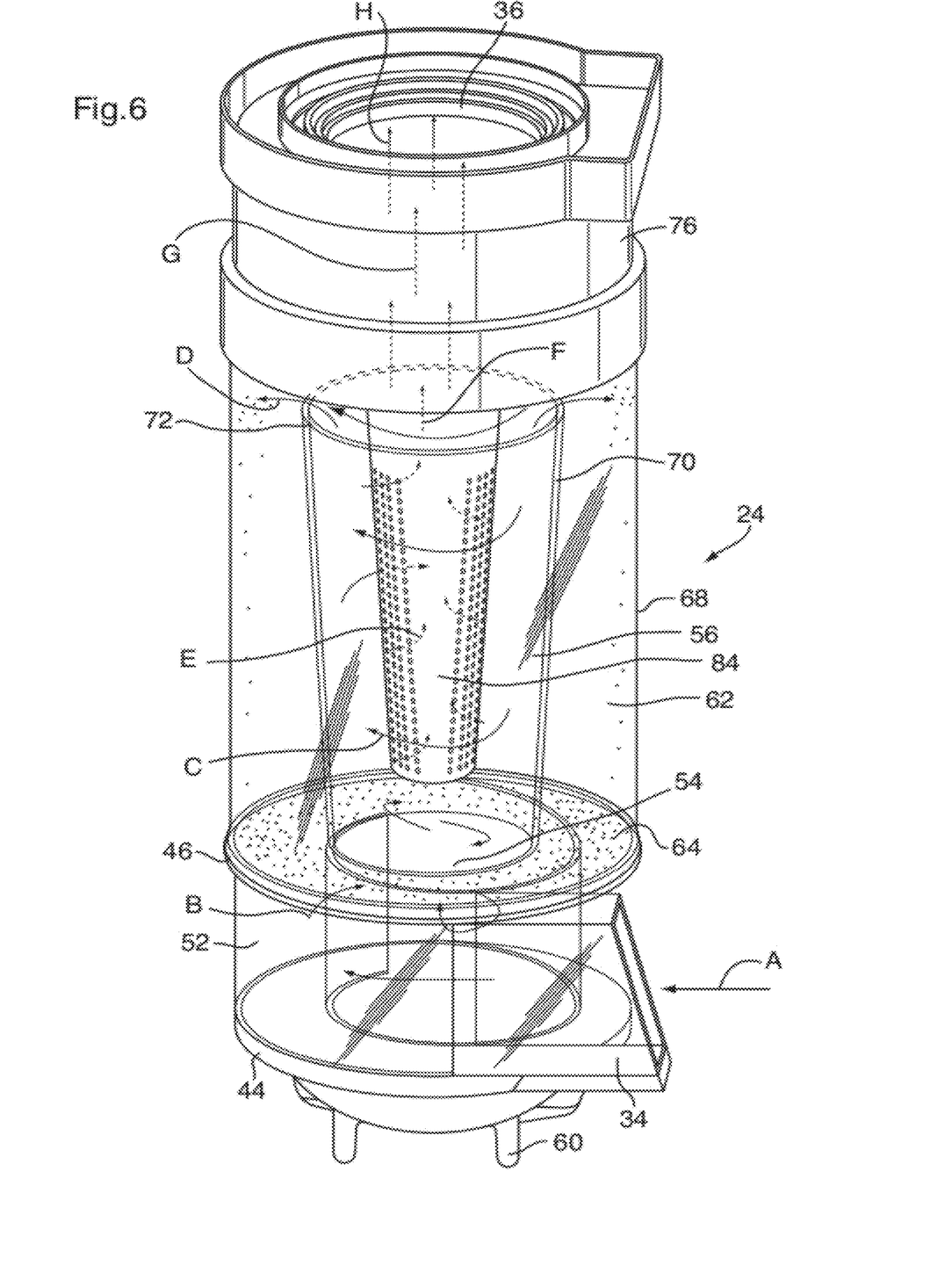
FIG. 6 is a schematic air flow diagram of the air flow through the cyclone unit; and, FIG. 7 is a perspective view of the lid and shroud shown in FIG. 5.

A schematic air flow diagram is shown in FIG. 6. As exemplified therein, the air enters cyclone unit 24 via inlet 34 (arrow A). The air travels through air inlet chamber 52 wherein it commences to travel in a rotational direction (arrow B). The air enters the inlet end 54 of cyclone chamber 56 wherein the air swirls upwardly in a cyclonic fashion (arrow C). The dirt is conveyed upwardly and exits cyclone chamber 56 via outlet 74 (arrow D). The separated material falls downwardly to lower wall 64 of dirt collection chamber 62. The air travels inwardly through perforations 98 into longitudinal passage 100 of shroud 84 (arrow E). The air travels longitudinally through passage 100 of shroud 84 (arrow F), through filter 102 (arrow G) and exits outlet 36 (arrow H).

When it is desired to empty dirt collection chamber 62, cyclone unit 24 may be removed from vacuum cleaner 10 and lid 76 removed (FIG. 5). The remaining portion of cyclone unit 24 may then be inverted so that any material collected in dirt collection chamber 62 may be emptied.

Although the intention has been described in conjunction with specific embodiments thereof, it is evident that many alternatives, modifications and variance will be apparent to those skilled in the art. Accordingly, it is indented to embrace all such alternatives, modifications and variations that fall within the spirit and broad scope of the following claims.

The invention claimed is:

1. A surface cleaning apparatus comprising:
   (a) an air flow passage extending from a dirty air inlet to a clean air outlet;
   (b) a dirt collection chamber extending between first and second opposed ends;
   (c) a unidirectional flow cyclone chamber positioned in the dirt collection chamber and comprising an air inlet at the first end, an air outlet at the second end and a cyclone chamber wall extending from the first end towards the second end, the cyclone chamber wall having an end face that is spaced from and faces the second end to define a gap between the end face and the second end, the gap comprising a dirt outlet of the cyclone chamber;
   (d) a perforated shroud comprising a downstream portion that is positioned between the second end and the end face of the cyclone chamber wall and an upstream portion that is positioned in the cyclone chamber, the upstream portion having a closed end that is distal to the second end, wherein the upstream portion of the shroud tapers inwardly from the downstream portion to the closed end; and
   (e) a suction motor positioned in the air flow passage.

2. The surface cleaning apparatus of claim 1 wherein the shroud tapers continuously inwardly from a position in a plane defined by the end face to the closed end.

3. The surface cleaning apparatus of claim 1 wherein the cyclone chamber wall is conical and increases in diameter towards the second end.

4. The surface cleaning apparatus of claim 1 wherein the cyclone chamber wall is tapered outwardly from the first end to the end face and the shroud is tapered inwardly, the shroud is spaced inwardly from the cyclone chamber wall by a distance that is generally constant along the length of the upstream portion of the shroud.

5. The surface cleaning apparatus of claim 1 wherein the downstream portion of the shroud has an outer wall that is continuous.

6. The surface cleaning apparatus of claim 1 wherein the upstream portion of the shroud is provided with air exit passages.

7. The surface cleaning apparatus of claim 1 wherein the shroud is mounted to the second end and the second end is removably mounted to the dirt collection chamber.

8. The surface cleaning apparatus of claim 1 wherein the second end comprises the upper end of the cyclone.

9. The surface cleaning apparatus of claim 1 wherein the closed end is spaced inwardly towards the end face up to one third the length of the cyclone chamber from the cyclone air inlet.

10. A surface cleaning apparatus comprising:
    (a) an air flow passage extending from a dirty air inlet to a clean air outlet;
    (b) a cyclone unit positioned in the air flow passage, the cyclone unit comprising at least one cyclone chamber and at least one dirt collection chamber positioned exterior to the cyclone chamber;
    (c) the cyclone chamber comprising an air inlet at a first end, an air outlet at an opposed second end and a cyclone chamber wall extending from the first end towards the second end, the cyclone chamber wall having an end face that is spaced from and faces the second end;
    (d) a perforated shroud extending from the air outlet towards the first end, wherein the shroud is tapered; and
    (e) a suction motor positioned in the air flow passage.

11. The surface cleaning apparatus of claim 10 wherein the shroud has an outlet end proximate the second end and a spaced apart, distal closed end and the distal closed end has a smaller diameter then the outlet end.

12. The surface cleaning apparatus of claim 11 wherein the shroud tapers continuously inwardly from the closed end to an end of the cyclone chamber defined by the end face.

13. The surface cleaning apparatus of claim 10 wherein the cyclone chamber is conical and increases in diameter towards the second end.

14. The surface cleaning apparatus of claim 10 wherein the cyclone chamber is tapered outwardly from the first end towards the second end and the shroud is tapered inwardly, the shroud is spaced, inwardly from the cyclone chamber wall by a distance and the distance is generally constant along the length of the shroud that is in the cyclone chamber.

15. The surface cleaning apparatus of claim 10 wherein a downstream portion of the shroud is positioned between the second end and the end face of the cyclone chamber wall and, the downstream portion has an outer wall that is continuous.

16. The surface cleaning apparatus of claim 10 wherein an upstream portion of the shroud is positioned in the cyclone chamber and perforations are provided only in an outer wall of the upstream portion.

17. The surface cleaning apparatus of claim 10 wherein the shroud is mounted to the second end and the second end is removably mounted to the cyclone unit.

18. The surface cleaning apparatus of claim 10 wherein the second end comprises the upper end of the cyclone unit.

19. The surface cleaning apparatus of claim 10 wherein the dirt collection chamber surrounds the cyclone chamber.

* * * * *